United States Patent [19]

Tanaka et al.

[11] Patent Number: 5,071,906

[45] Date of Patent: Dec. 10, 1991

[54] POLARIZING FILM AND PROCESS FOR THE PRODUCTION OF THE SAME

[75] Inventors: Chikafumi Tanaka; Masami Shiozawa; Minoru Nishinohara, all of Kyoto, Japan

[73] Assignee: Unitika Ltd., Hyogo, Japan

[21] Appl. No.: 614,964

[22] Filed: Nov. 16, 1990

Related U.S. Application Data

[63] Continuation of Ser. No. 215,142, Jul. 5, 1988, abandoned.

[30] Foreign Application Priority Data

Jul. 3, 1987 [JP] Japan .................... 62-167492

[51] Int. Cl.⁵ .................... C08L 29/04; B29D 11/00
[52] U.S. Cl. .................... 524/557; 524/438; 264/1.3; 264/288.4; 264/289.6
[58] Field of Search .................... 524/438, 557; 264/288.4, 289.6, 1.3

[56] References Cited

U.S. PATENT DOCUMENTS

| | | | |
|---|---|---|---|
| 2,173,304 | 9/1939 | Land et al. | |
| 3,265,777 | 8/1966 | Marks | 264/1.3 |
| 4,396,642 | 8/1983 | Bolt et al. | 522/153 |
| 4,427,741 | 1/1984 | Aizawa et al. | 428/483 |
| 4,802,745 | 2/1989 | Okada et al. | 528/380 |

FOREIGN PATENT DOCUMENTS 55-90926  7/1980  Japan .
58-68008  4/1983  Japan .
60-16903  4/1985  Japan .

OTHER PUBLICATIONS

The Merck Index, 9th Edition, p. 946.

*Primary Examiner*—Paul R. Michl
*Assistant Examiner*—Peter Szekely
*Attorney, Agent, or Firm*—Sughrue, Mion, Zinn, Macpeak & Seas

[57] ABSTRACT

A polarizing film comprising a uniaxially stretched film containing a polyvinyl alcohol having a degree of polymerization of at least about 2,500, and at least one polarizing agent selected from iodine and a dichroic dye, as well as a process for the production of the same. This polarizing film is superior in heat resistance and moist heat resistance to conventional films and has excellent optical properties, such as a high polarizing coefficient and transmittance.

10 Claims, No Drawings

POLARIZING FILM AND PROCESS FOR THE PRODUCTION OF THE SAME

This is a continuation of application Ser. No. 215,142, filed July 5, 1988.

FIELD OF THE INVENTION

This invention relates to a polarizing film and a process for the production of the same. More particularly, it relates to a polarizing film including a uniaxially stretched film of polyvinyl alcohol (hereinafter, "PVA") having a high degree of polymerization as a base, with significantly improved heat resistance and moist heat resistance as well as excellent optical properties; and a process for the production of the same.

BACKGROUND OF THE INVENTION

Known polarizing films include a uniaxially stretched PVA film on which iodine and/or dichroic dye(s) are adsorbed. A PVA film employed in this polarizing film as a base generally comprises PVA of a low degree of polymerization, such as 2,000 or below. This polarizing film has been widely employed, for example, in liquid crystal displays of, e.g., pocket electric calculators, watches, word processors, liquid crystal printers, liquid crystal color TV's, various instruments and automotive instrument panels. Further, it is inserted into laminated glass to thereby form an anti-glare film for, e.g., sunglasses or ski goggles. Although this polarizing film exhibits an excellent polarizing coefficient, it has a poor water resistance and moist heat resistance and lacks heat resistance since it contains a hydrophilic polymer as the base. Therefore, this polarizing film frequently suffers from the deterioration of optical properties, such as a decrease in the polarizing coefficient, when exposed to high temperature and/or humidity. With the development of the electronic industry, the application range of liquid crystal displays has been more and more extended. Accordingly, a polarizing film is urgently required which has a high water resistance, heat resistance and moist heat resistance in addition to excellent optical properties such as a high polarizing coefficient and transmittance.

Under these circumstances, there has been proposed a uniaxially stretched polyester film of improved heat resistance and moist heat resistance which is obtained by incorporating a dichroic dye into a polyester, melt-extruding the resulting mixture and then stretching the same (cf. JP-A-58-68008, JP-A-58-124621, JP-A-60-125804, JP-A-61-65202, JP-A-62-141503 and JP-A-62-145204) (the term "JP-A" as used herein means an "unexamined published Japanese patent application"). Although this polarizing film is superior in heat resistance and moist heat resistance to a conventional PVA polarizing film, the polarizing coefficient thereof is still insufficient. For this reason, it has been seldom used in practice, compared with PVA polarizing films.

SUMMARY OF THE INVENTION

One object of the present invention is to provide a polarizing film having an improved heat resistance and moist heat resistance.

A further object of the invention is to provide a polarizing film having excellent optical properties such as a high polarizing coefficient and transmittance.

Another object of the invention is to provide a process for the production of the same.

As a result of extended studies, it has now been found that these and other objects of the present invention can be achieved by employing a uniaxially stretched film containing PVA of a high degree of polymerization as a base film.

Accordingly, the present invention relates to a polarizing film comprising a uniaxially stretched film containing a PVA having a degree of polymerization of least about 2,500 and at least one polarizing agent selected from iodine and a dichroic dye. The invention also relates to a process for producing a polarizing film comprising the steps of: (a) dissolving PVA having a degree of polymerization of at least about 2,500 in a solvent in a concentration of about 2 to 35% by weight; (b) forming a film from the resulting PVA solution; and (c) uniaxially stretching the film obtained to provide a stretched film; provided that at least one polarizing agent selected from iodine and a dichroic dye is present in the solution in step (a); or is applied to the film in step (b) or step (c), or to the stretched film.

DETAILED DESCRIPTION OF THE INVENTION

Now the present invention will be described in greater detail. The polarizing film of the present invention employs a uniaxially stretched PVA film as a base. The PVA used in the present invention should have a degree of polymerization of at least about 2,500, preferably at least about 4,500 and still more preferably about 6,000 to 10,000. From the viewpoint of the optical properties and durability of the polarizing film, it is preferred that the degree of polymerization of the PVA is as high as possible. However, the degree of polymerization of the PVA is typically less than about 10,000 in practice, by taking the production cost into consideration. A polarizing film containing a PVA film wherein the degree of polymerization of the PVA is less than about 2,500 is unsatisfactory in optical properties, heat resistance and moist heat resistance.

The improved heat resistance and moist heat resistance of the polarizing film of the present invention, which contains PVA of such a high degree of polymerization as specified above, makes it highly useful, since the poor heat resistance and moist heat resistance of conventional ones are serious disadvantages. Furthermore, the polarizing film of the present invention has excellent optical properties such as a high polarizing coefficient and transmittance. In the polarizing film, the transmittance has a relationship to be contrary to the polarizing coefficient, and the transmittance and polarizing coefficient are adjusted in accordance with the dyeing degree obtained by a polarizing agent. The higher the concentration of the polarizing agent in the polarizing film, the transmittance of films is reduced but the polarizing coefficient is increased (the maximum value of the polarizing coefficient becomes 100%). On the other hand, the lower the concentration of the polarizing agent, the transmittance of films is increased but the polarizing coefficient is reduced. A highly efficient polarizing film excels in both of transmittance and polarizing coefficient. The ideal sets of transmittance and polarizing coefficient values of the polarizing film are 50% and 100%, respectively. The polarizing film according to the present invention exhibits, for example, a polarizing coefficient of 100 to about 98% when the transmittance is about 42 to 45%, preferably a polarizing coefficient of 100 to about 99% when the transmittance is about 44 to 48%. Without being bound by theory, it is considered that this might be due to the fact that the polarizing film of the present invention is highly stretchable in a single direction and thus the orientation of the iodine or dichroic dye is improved thereby.

It is preferred that the PVA used in the present invention has a degree of saponification of at least about 95% by mol and still preferably at least about 99% by mol.

The polarizing film of the present invention may be produced by, for example, the following process.

PVA of a degree of polymerization of about 2,500 or more, as mentioned above, is dissolved in a solvent to thereby give a polymer concentration of about 2 to 5% by weight, preferably about 4 to 18% by weight, most preferably about 5 to 12% by weight. When the concentration of the PVA exceeds about 35% by weight, the resulting solution becomes highly viscous. Thus, the uniformity of the solution is lowered and PVA molecular chains would entwine each other, which lowers the stretchability of the obtained film. Thus, it is undesirable to employ such a high polymer concentration. When the concentration of the PVA solution is less than about 2% by weight, on the other hand, a film can be hardly formed.

As one embodiment of the production process according to the present invention, the step of preparing the solution, in which a polarizing agent is dissolved in the PVA solution, is included In this step, the amount of the polarizing agent used varies depending upon a kind of polarizing agents, but its amount preferably ranges from about 0.2 to 3 wt% per the weight of the PVA solution. The preparation of the PVA solution having the polarizing agent dissolved therein is preferably carried out at a temperature of from about 60° to 120° C. When iodine is used as a polarizing agent in such preparation, it is more preferred that said preparation is carried out at a lower temperature among the above temperature ranges of from about 60° to 120° C. to prevent the sublimation of iodine. As the method for preparing the abovementioned solution, for example, a method comprising steps of adding the polarizing agent in the following solvents for dissolving PVA, dissolving the polarizing agent therein under stirring, and then adding PVA in the resulting solution, followed by dissolving PVA therein under stirring, can be employed.

Examples of the solvent for the PVA include organic solvents such as dimethyl sulfoxide (hereinafter, "DMSO"), dimethylformamide, acetone, methyl alcohol, n-propyl alcohol, ethylene glycol and propylene glycol. Any one of these solvents or a mixture thereof may be used. It is further possible to use a mixture of one or more of these organic solvents and an aqueous solution of one or more of inorganic salts such as calcium chloride or lithium chloride. It is also possible to use water with the one or more solvents. Among these organic solvents, DMSO is particularly preferred and a solvent mixture of DMSO and water is also preferred. In the latter case, the mixture contains from about 55% by weight up to almost 100% by weight of DMSO and from almost 0% by weight up to about 5% by weight of water. In this case, it is preferred to contain about 70 to 98% by weight of DMSO. When a solvent mixture containing DMSO and water at a ratio of about 90 to 96% by weight of DMSO and about 10 to 4% by weight of water is employed as the solvent, a PVA solution of a relatively high concentration would not be solidified within a relatively short period of time required for the formation of a film at a relatively low temperature, i.e., around room temperature (about 15° to 35° C.). This might be caused by the fact that the high compatibility of the PVA with the solvent would enhance the solubility of the PVA. Therefore, the use of such a solvent mixture as defined above is advantageous in that the PVA solution would not be solidified until it is introduced into a coagulating solution, and thus a uniform film with little variation in thickness can be formed at room temperature.

According to the process of the present invention, a film is produced from the PVA solution in the following manner.

For the formation of a film, the PVA solution is discharged into air or an inert atmosphere such as a nitrogen atmosphere through, for example, a slit outlet to thereby form a liquid film of PVA solution. Then, it is introduced into a coagulating solution wherein a solidified film is formed. Alternately, the PVA solution may be formulated into a liquid coating in the above atmosphere by using, for example, a roll coater. It is further possible to directly introduce the PVA solution into the coagulating liquor to thereby form a solidified film, without discharging the solution into any atmosphere. Alternately, a PVA film may be produced by forming a liquid film of PVA solution in the atmosphere, once cooling the liquid film with a cooling medium such as carbon tetrachloride, decalin, paraffin or trichloroethylene to thereby allow the same to be solidified, desolvating the same in a desolvating solution, and then drying. Cooling medium having lower boiling point such as carbon tetrachloride and trichloroethylene would not need the desolvating process. The method for the preparation of the PVA film is described, for example, in *Polyvinyl Alcohol-Properties and Applications*, edited by C.A. Finch, Croda Polymers Ltd., Luton, John Wiley & Sons, pages 378-379 (1973).

Examples of the coagulating solution or desolvating solution include alcohols such as methanol, ethanol, propanol, isopropanol and butanol, and acetone. Any one of these materials or a mixture thereof may be employed.

The liquid film of the PVA solution may be typically formed at a temperature of the PVA solution of about 10° to 120° C., though the temperature may vary depending on the employed solvent. As described above, a uniform liquid film of PVA solution showing little variation in thickness can be obtained at a relatively low temperature, i.e., around room temperature of 15° to 35° C., by using a solvent containing 90 to 96% by weight of DMSO and 10 to 4% by weight of water. This liquid film may be, either directly or after discharging in an atmosphere, introduced into a coagulating solution or cooled with a cooling medium, introduced into a desolvating solution to thereby form a solidified film, and then dried.

The unstretched film thus obtained is then stretched in a single direction up to about 5-fold or more, preferably about 7-fold or more in the range of avoiding breakage. When the stretching ratio is less than about 5-fold, the resulting polarizing film would be unsatisfactory in polarizing coefficient and transmittance. Although the higher stretching ratio the better, the upper limit is approximately 20-fold from a practical viewpoint. Most preferred stretching ratio may be about 8 to 15-fold. The stretching rates is about 10 to 300 %/min of original length, preferably about 50 to 200 %/min. The wet-stretching of PVA film is described, for example, in Y. Oishi and K. Miyasaka, *Polymer Journal*, 19(3), 331-336 (1987).

Either wet- or dry-stretching may be employed.

In the case of wet-stretching, the unstretched film is preliminarily allowed to swell in, for example, a swelling liquor at room temperature, i.e., about 15° to 35° C. or slightly higher, at which the film is not dissolved. Then, the stretching is carried out in a liquid at about 15° to 60° C. When the stretching temperature is extremely low, it is impossible to achieve a sufficient stretching ratio. Thus, it is preferred to adjust the stretching temperature at least above the lower limit as defined above, i.e., about 15° C. When the stretching is to be effected in a liquid at a high temperature, e.g., about 55° to 60° C., it is preferred to carry out preliminary stretching at around room temperature to thereby prevent the PVA film from being dissolved at a higher temperature, and then elevating the temperature while applying tension thereto, depending on the degree of polymerization of the PVA.

Examples of the liquid in which the swelling or stretching may be carried out include a dyeing solution containing polarizing agent and dyeing aid such as inorganic salts, and aqueous solution of, e.g., about 0.5 to 3% by weight boric acid which is used as a crosslinking agent.

In the case of dry-stretching, the procedure is carried out at a temperature of about 100° to 250° C. an atmosphere such as air or, preferably, nitrogen gas. When the stretching temperature is lower than about 100° C., it is sometimes impossible to establish a sufficient stretching ratio. When it exceeds about 250° C., on the other hand, the film might melt at the subsequent thermal treatment step, at which a higher temperature than that of stretching is needed.

The film thus uniaxially stretched may be then subjected to a thermal treatment. This thermal treatment, which may be carried out in air or in an inert gas atmosphere, further improves the durability including dimensional stability, heat resistance and moist heat resistance of the stretched polarizing film. This treatment may be preferably effected at about 180° to 260° C., preferably about 200° to 240° C., for about 0.1 to 10 minutes. It is preferred that this treatment is effected at a temperature higher than the stretching temperature. It is undesirable to carry out the thermal treatment at a temperature lower than about 180° C., since the degree of crystallinity of the film is hardly elevated in this case and thus the durability of the film is scarcely improved. On the other hand, it is also undesirable that the temperature exceeds about 260° C., since the film might melt even though it is treated under applying tension thereto.

It is preferable that the above thermal treatment be performed under a tension applied to the film sufficient to maintain the same length achieved after stretching, and to avoid any looseness.

Iodine and/or dichroic dye(s) may be added to the film in a conventional manner. That is to say, they may be added in any step before or during the stretching step following the dissolution of the PVA in the solvent. Alternately, they may be added in a separate step after the completion of the stretching.

The procedure for the addition of iodine is not particularly restricted. For example, the film may be immersed in an aqueous solution of a mixture of iodine and potassium iodide. This aqueous solution may further contain a crosslinking agent such as boric acid, borax or glutaraldehyde in order to inhibit the scattering of the iodine, and a treatment with a crosslinking agent may be separately carried out after the dyeing.

As the dichroic dye, yellow, orange, blue, purple or red dyes may be used. Typical examples thereof include direct dyes including C.I. Direct dyes such as Black 17, 19 and 154, Brown 44, 106, 195, 210 and 223, Red 2, 23, 28, 31, 37, 39, 79, 81, 240, 242 and 247, Blue 1, 15, 22, 78, 90, 98, 151, 168, 202, 236, 249 and 270, Violet 9, 12, 51, and 98, Green 1 and 85, Yellow 8, 12, 44, 86 and 87, Orange 26, 39, 106 and 107 and dispersion dyes including C.I. Dispersion dyes such as Blue 214, Red 60 and Yellow 56. In the present invention, two or more dichroic dyes may be used together. Furthermore, iodine and dichroic dye(s) may be used together in the present invention in order to control the hue.

The iodine and/or dichroic dye(s) may be added as mentioned above during the preparation of the PVA solution.

When wet-stretching is to be effected, iodine and/or dichroic dye(s) used as a polarizing agent may be simultaneously added during the swelling or stretching step. When the iodine is applied to the swelling or stretching step, the solution of about 0.001 to 3% by weight of iodine and about 0.005 to 15% by weight of potassium iodide, preferably the solution of about 0.03 to 1% by weight of iodine and about 0.2 to 5% by weight of potassium iodide, is usually used. When the dichroic dye is applied to the abovementioned step, the concentration of the dichroic dye used preferably ranges from about 0.001 to 3% by weight. The film thus dyed and stretched is then dried and subjected to the abovementioned thermal treatment. Only for iodide case, the temperature must be lowered, or dyeing must be effected after thermal treatment. Alternately, the stretched and thermally treated film may be dyed with iodine and/or dichroic dye(s). In this step, when iodine is applied, about 0.1 to 3% by weight of iodine and about 0.5 to 15% by weight of potassium iodide are preferably used, and when dichroic dye is used, about 0.1 to 3% by weight of dichroic dye is preferably used. As the method for applying iodine or dichroic dye, a dipping method may be employed. When dry-stretching and dyeing with an iodine dye are combined, it is preferred to carry out the thermal treatment after the stretching to thereby inhibit the sublimation of the iodine at a high temperature. When a dichroic dye highly resistant to thermal degradation and sublimation is used, the dye may be preliminarily added during the preparation of the PVA solution. Alternately, the film may be dyed prior to the stretching or the dyeing may be carried out during the final step in this case. Iodine and/or dichroic dye(s) may be added to the film in a conventional manner, similar to the case of the wet-stretching. When dyeing is effected after the thermal treatment in the dry-stretching process, the high degree of crystallinity of the film makes the dyeing difficult. Therefore, it is required in this case to prolong the dyeing time up to, e.g., about 30 minutes to 1 hour or to enhance the concentration of the iodine up to, e.g., about 0.5 to 2% by weight and/or dichroic dye(s).

When the abovementioned polarizing agent(s) are applied, a swelling or stretching step is preferred in the wet-stretching process and an after-stretching step is preferred in the dry-stretching process. In either case, it is preferred to carry out the crosslinking treatment using a boric acid solution in a concentration of about 0.5 to 15 wt%.

The polarizing film of the present invention can be used alone or in combination with a support or other layers. For example, an optically isotropic film having a good transparency such as polyarylate film, triacetate film or (meth)acrylate can be laminated on the abovementioned polarizing film.

In the abovementioned laminating treatment, for example, a solution having adhesives such as isocyanate dissolved in a solvent is applied on a polyarylate film by means of a roll coater or a bar coater, the coated film is dried to remove the solvent, and then the polyarylate film is laminated on the polarizing film by means of a laminator.

Among these films, the polyarylate film (trade name, "EMBLATE" manufactured by UNITIKA LTD.) having a thickness of about 50 to 130 μm is particularly preferred. Since the polyarylate film is an optically isotropic and heat resistant film having properties of hardly passing a moisture, it is preferably used as a protective film for the polarizing film.

The polarizing film of the present invention containing PVA of a high degree of polymerization has a significantly improved heat resistance and moist heat resistance, compared with conventional films which are seriously deficient, as well as an excellent polarizing coefficient and transmittance. In addition, the polarizing film of the present invention contains PVA of a high degree of polymerization and is used together with an organic solvent. Thus, a dispersion dye, which extends the selection range of dyes, can be used making the polarizing film of the present invention quite advantageous.

The polarizing film of the present invention is widely applicable, not only to liquid crystal displays of, for example, work stations of office automation systems, liquid crystal TV's, automotive instrument panels, which should have a high moist heat resistance, and various instruments, but also to filters of panel photographs, sunglasses, residential or building windows and various sensors.

According to the production process of the present invention, a polarizing film, which can be stretched at a high ratio compared with conventional ones and has excellent optical properties as well as a high heat resistance and moist heat resistance, can be efficiently produced by using a commercially available PVA of a degree of polymerization of at least about 2,500, preferably at least about 4,000.

To further illustrate the present invention, the following specific Examples are provided, but the present invention is not to be construed as being limited thereto. Unless otherwise indicated, all parts, percents and ratios are by weight. In the Examples, transmittance and polarizing coefficient are determined by the following methods.

The transmittance of visible light (wavelength: 400 to 700 nm) was determined with a spectrophotometer. A polarizer was placed in the incident light side. The transmission axis of a polarizing film sample was overlapped with the optical axis of the polarizer and then placed at right angles thereto. Then, the transmittance of the polarizing film in each case was determined. The algebraic mean of the data was referred to as the transmittance. According to JIS-Z-8701 ("JIS" refers to Japanese Industrial Standard), the transmittance was determined by correcting the visibility over the visible light range under 2° viewing angle "XYZ colour specification system" by using a standard illuminant C. When a red dichroic dye was used, however, the transmittance at 525 nm was determined. The polarizing coefficient was calculated according to the following equation by determining the transmittance with axes parallel (T∥), which was determined by overlapping two polarizing films in such a manner as to make the axes thereof parallel with each other, and the transmittance with axes crossed (T⊥), which was determined by overlapping the same in such a manner as to make the axes at right angles to each other:

$$\text{Polarizing coefficient (\%)} = \sqrt{(T\| - T\bot)/(T\| + T\bot)} \times 100$$

The ideal sets of maximum values of transmittance and polarizing coefficient of a polarizing film are 50% and 100%, respectively.

Although a polarizing film is usually used in a state having a protecting film laminated thereon, various properties of unprotected polarizing films were determined in the following Examples and Comparative Examples.

Example 1 AND COMPARATIVE Example 1

PVA having a degree of polymerization of 4,980 and a degree of saponification of 99.8% was dissolved in a solvent mixture of DMSO and water at a ratio by weight of 95/5 under heating to 80° C. to thereby give a PVA concentration of 7% by weight. Thus, a PVA film-forming solution was obtained. This solution was discharged into a methanol bath via a slit outlet while maintaining the same at 20° C. to thereby form a film 50 μm thick. The resulting film was air-dried at room temperature and then uniaxially stretched at 155° C. up to 7-fold. Then, the stretched film was subjected to thermal setting in nitrogen atmosphere at 180° C. for 5 minutes while applying sufficient tension to maintain the stretch ratio and avoiding any looseness. Then, the film was immersed in an aqueous solution containing 1% by weight of iodine and 5% by weight of potassium iodide for 30 minutes and then in a 3% by weight boric acid bath for 15 minutes at room temperature. After air-drying, a polarizing film was obtained. The obtained polarizing film had a thickness of 11 μm, a bluish purple color, a transmittance of 48.3% and a polarizing coefficient of 99.9%.

This polarizing film was allowed to stand in a thermohydrostat at 60° C. and 90% R.H. for five hours and then the transmittance and polarizing coefficient thereof were determined again. As a result, the transmittance of the polarizing film was 52.3% while the polarizing coefficient thereof was 93.0%, showing little change in the properties.

For comparison, the transmittance and polarizing coefficient of a polarizing film containing PVA of a degree of polymerization of 1,700 and the same polarizing agents as those employed in Example 1 (transmittance: 41.2%, polarizing coefficient: 96.4%, thickness: 13 μm and stretching ratio: 4.5-fold) were similarly determined. As a result, after the moist heat treatment the transmittance of this film was 62.7% while the polarizing coefficient thereof was 72.4%.

These results indicate that the polarizing film of the present invention underwent far less degradation in the transmittance and polarizing coefficient at 60° C. and 90% R.H., compared with a conventional one.

Example 2

The procedure of Example 1 was repeated except that the film was immersed not in an aqueous solution containing 1% by weight of iodine and 5% by weight of potassium iodide but in a dyeing liquor containing 0.05% by weight of Congo Red (a dichroic dye). Thus, a red transparent polarizing film was obtained. The transmittance of the polarizing film at a wavelength of 525 nm was 36.9% while the polarizing coefficient thereof was 85.1%.

Example 3

PVA of a degree of polymerization of 4,980 and a degree of saponification of 99.8% was dissolved in a mixture of DMSO and water at a ratio by weight of 95/5 under moderately heating at a low temperature of 80° C. to thereby give a 7% by weight PVA solution. This solution was applied onto a polyethylene terephthalate (hereinafter, "PET") film 100 $\mu$m thick at 20° C. with a bar coater and immersed in a methanol bath for ten minutes to thereby form a film. The resulting film was air-dried at room temperature. Thus, a PVA film was obtained. Then, the PVA film was stripped from the PET film and was immersed in a solution of 0.05% by weight of iodine and 0.25% by weight of potassium iodide at 20° C. for five minutes and uniaxially stretched up to 9-fold therein. Then, the stretched film was immersed in a 3% by weight boric acid bath at room temperature for 15 minutes, air-dried and subsequently thermally treated at 65° C. The polarizing film thus obtained (thickness: 7 $\mu$m) showed a transmittance of 44.1% and a polarizing coefficient of 100%.

EXAMPLE 4 AND COMPARATIVE EXAMPLE 2

The procedure of Example 3 was repeated except that the film was not immersed in the iodine/potassium iodide solution but in methanol containing 0.5% by weight of methylene 4-aminoxanthopurpurin available, for example, under the trademark Miketon Fast Pink RL (mfd. by Mitsui Toatsu Chemicals, Inc.) which was employed as a coagulating solution and a dyeing solution for the PVA film. Thus, a red and transparent polarizing film was obtained. The transmittance of this film at a wavelength of 525 nm was 33.0% while the polarizing coefficient thereof was 98.7%.

It was attempted to dye a commercially available PVA film having a degree of polymerization of 1,700 and a degree of saponification of 99.9% in methanol containing 0.5% by weight of Miketon Fast Pink RL, in the same manner as the above process. However, it was impossible to dye this film.

Example 5

A PVA film-forming solution, which was prepared in the same manner as the one described in Example 4 except for adding 1% by weight of iodine, was applied onto a PET film at 20° C. with a bar coater and then immersed in a methanol bath to thereby form a film. The obtained film was air-dried at room temperature and then stretched up to 6-fold in a 3% boric acid solution for 15 minutes at room temperature. Then, the stretched film was washed with water and air-dried at room temperature. The polarizing film thus obtained (thickness: 11 $\mu$m) showed a transmittance of 46.2% and a polarizing coefficient of 99.4%.

Example 6

The procedure of Example 5 was repeated except that the iodine was replaced by 1% by weight of Congo Red. The dry PVA film thus obtained was stretched up to 7-fold in the same boric acid solution at room temperature, washed with water and air-dried. The transmittance at a wavelength of 525 nm of the polarizing film thus obtained (thickness: 11 $\mu$m) was 30.1% while the polarizing coefficient thereof was 99.9%.

Example 7

The procedure of Example 4 was repeated except that PVA of a degree of polymerization of 3,250 and a degree of saponification of 99.6% was employed to thereby give a PVA film. The obtained PVA film was stripped from the PET film and was immersed in a solution containing 0.03% by weight of iodine and 0.20% by weight of potassium iodide at 20° C. for five minutes and then uniaxially stretched up to 9-fold therein. Then, the stretched film was immersed in a 3% by weight boric acid bath at room temperature for 15 minutes.

The transmittance of the obtained polarizing film (thickness: 5 $\mu$m) was 46.0% while the polarizing coefficient thereof was 97.4%.

Example 8

PVA having a degree of polymerization of 6,740 and a degree of saponification of 99.2% was dissolved in a mixture of DMSO and water at a ratio by weight of 95/5 at a low temperature of 80° C. to thereby give a 4% by weight PVA solution. This solution was applied onto a PET film with a bar coater and immersed in a methanol bath for ten minutes to thereby form a film. The obtained film was air-dried. Thus, a PVA film was obtained.

Then, the PVA film was stripped from the PET film and treated in the analogous manner as the one described in the above Example 4 to thereby give a polarizing film. The transmittance of this film (thickness: 5 $\mu$m) was 46.0% while the polarizing coefficient thereof was 99.2%.

While the invention has been described in detail and with reference to specific embodiments thereof, it will be apparent to one skilled in the art that various changes and modifications can be made therein without departing from the spirit and scope thereof.

What is claimed is:

1. A polarizing film comprising a uniaxially stretched film containing a polyvinyl alcohol having a degree of polymerization of about 2,500 to about 10,000, and at least one polarizing agent selected from iodine and a dichroic dye.

2. The polarizing film as claimed in claim 1, wherein said polyvinyl alcohol has a degree of polymerization of at least about 4,500.

3. The polarizing film as claimed in claim 1, wherein said polyvinyl alcohol has a degree of polymerization of about 6,000 to 10,000.

4. The polarizing film as claimed in claim 1, wherein said polarizing agent is dissolved in said polyvinyl alcohol solution before formation of the polarizing film.

5. The polarizing film as claimed in claim 1, wherein said polarizing film is polarized by forming a film with a mixture containing about 0.2 to 3% by weight of at least one polarizing agent selected from a group consisting of iodine and dichroic dye dissolved in a polyvinyl alcohol solution.

6. The polarizing film as claimed in claim 1, wherein said polyvinyl alcohol has a degree of polymerization of about 4,980 and a degree of hydrolysis of about 99.8%, and wherein said polarizing film is polarized by coating a film with a solution containing a polarizing agent selected from the group consisting of an aqueous solution containing 1% by weight of iodine and 5% by weight of potassium iodide;
a dyeing liquor of 0.05% Congo Red (C.I. Direct Red 28);
an aqueous solution containing 0.05% by weight of iodine and 0.25% by weight of potassium iodide;
methanol containing 1% by weight of iodine; and
methanol containing 0.5% by weight of methylene 4-aminoxanthopurpurin.

7. The polarizing film as claimed in claim 1, wherein said polyvinyl alcohol has a degree of polymerization of about 3,250 and a degree of hydrolysis of about 99.6% and wherein said polarizing film is polarized by coating a film with a solution containing 0.03% by weight of iodine and 0.20% by weight of potassium iodide.

8. The polarizing film as claimed in claim 1, wherein said polyvinyl alcohol has a degree of polymerization of about 6,740 and a degree of hydrolysis of about 99.2% and wherein said polarizing film is polarized by coating a film with methanol containing 0.5% by weight of methylene 4-aminoxanthopurpurin.

9. The polarizing film as claimed in claim 6, wherein said polarizing agent comprises methanol containing 1% by weight of Congo Red (C.I. Direct Red 28).

10. The polarizing film as claimed in claim 1, wherein said polyvinyl alcohol has a degree of hydrolysis of 95 to 100 mol%.

* * * * *